(12) United States Patent
Chen

(10) Patent No.: US 9,057,820 B2
(45) Date of Patent: Jun. 16, 2015

(54) THIOURETHANE-BASED LENS ELEMENTS AND PROCESSES FOR THEIR PRODUCTION

(75) Inventor: Fang Chen, Hallett Cove (AU)

(73) Assignee: CARL ZEISS AUSTRALIA HOLDINGS LIMITED, Lonsdale (AU)

( * ) Notice: Subject to any disclaimer, the term of this patent is extended or adjusted under 35 U.S.C. 154(b) by 0 days.

(21) Appl. No.: 13/378,573

(22) PCT Filed: Jun. 16, 2010

(86) PCT No.: PCT/AU2010/000739
§ 371 (c)(1),
(2), (4) Date: Feb. 16, 2012

(87) PCT Pub. No.: WO2010/148424
PCT Pub. Date: Dec. 29, 2010

(65) Prior Publication Data
US 2012/0157651 A1    Jun. 21, 2012

(30) Foreign Application Priority Data
Jun. 23, 2009    (AU) ................................ 2009902890

(51) Int. Cl.
*G02B 1/04* (2006.01)
*C08G 18/24* (2006.01)
*C08G 18/38* (2006.01)
*C08G 18/75* (2006.01)

(52) U.S. Cl.
CPC .............. *G02B 1/043* (2013.01); *C08G 18/242* (2013.01); *G02B 1/041* (2013.01); *C08G 18/3876* (2013.01); *C08G 18/758* (2013.01)

(58) Field of Classification Search
USPC ........................... 528/58, 77, 81, 85; 359/642
IPC .... C08G 18/242,18/3876, 18/758; C08L 74/04; G02B 1/041, 1/043
See application file for complete search history.

(56) References Cited

U.S. PATENT DOCUMENTS

| | | | |
|---|---|---|---|
| 4,680,369 A | 7/1987 | Kajimoto et al. |
| 4,689,387 A | 8/1987 | Kajimoto et al. |
| 4,780,522 A | 10/1988 | Kajimoto et al. |
| 4,791,185 A | 12/1988 | Kanemura et al. |
| 5,059,673 A | 10/1991 | Kanemura et al. |
| 5,084,545 A | 1/1992 | Nagata et al. |
| 5,087,758 A | 2/1992 | Kanemura et al. |
| 5,191,055 A | 3/1993 | Kanemura et al. |
| 5,310,847 A | 5/1994 | Yean et al. |
| 5,440,358 A | 8/1995 | Suzuki et al. |
| 5,635,580 A | 6/1997 | Kosaka et al. |
| 5,693,738 A | 12/1997 | Okazaki et al. |
| 2005/0014088 A1 | 1/2005 | Nakamura et al. |
| 2007/0241313 A1 | 10/2007 | Kato |
| 2008/0097045 A1 | 4/2008 | Isahaya et al. |
| 2010/0010192 A1 | 1/2010 | Kawaguchi et al. |

FOREIGN PATENT DOCUMENTS

| | | |
|---|---|---|
| JP | 2004-202995 A | 7/2004 |
| WO | 2007/131145 A1 | 11/2007 |
| WO | WO 2008/047626 A1 | 4/2008 |

OTHER PUBLICATIONS

International Search Report (PCT/ISA/210) issued on Aug. 9, 2010, by Australian Patent Office as the International Searching Authority for International Application No. PCT/AU2010/000739.

*Primary Examiner* — Rabon Sergent
(74) *Attorney, Agent, or Firm* — Roberts Mlotkowski Safran & Cole, P.C.

(57) ABSTRACT

An optical lens element resin composition including:
dicyclohexylmethane diisocyanate;
a polythiol compound having 3 or 4 thiol groups; and
a thermal catalyst.

12 Claims, No Drawings

THIOURETHANE-BASED LENS ELEMENTS AND PROCESSES FOR THEIR PRODUCTION

FIELD

The present invention relates generally to lens elements, such as ophthalmic lenses, and more specifically to polymeric thiourethane-based lens elements and processes for producing them.

BACKGROUND

A majority of patients who require prescription lenses now prefer and purchase plastic lenses. Plastic lenses (otherwise known as 'organic glass' lenses) have numerous advantages over the more traditional glass lenses, including reduced weight, higher clarity, they can be dyed or tinted easily, machined easily and they are relatively stable.

Plastic lenses are typically made by cast moulding, in which a monomer or prepolymer material is deposited in a cavity defined between optical surfaces of opposing mould parts. The monomer or prepolymer material is then cured in the assembled mould to form a solid plastic lens. Both thermoplastic and thermoset resins are used for this purpose. Particular thermoset resins that have been used include polymers of diethylene glycol bis(allyl carbonate) such as CR-39™ (a trade mark of PPG Industries), whilst a popular thermoplastic resin that is used is a polycarbonate of bisphenol A.

One problem associated with some of the materials used to form plastic lenses is their relatively low refractive index. Low refractive index plastic lens materials may be less desirable than other materials because of the thicker lens optic necessary to achieve a given refractive power.

To address the problems with the refractive index of these materials a range of thiourethane-based plastic lens materials have been developed. These materials typically have a relatively high refractive index which means that thinner lenses can be formed for a given refractive power. Considerable research has now been carried out with sulfur-containing polyurethane compositions in order to maximise the refractive index of the lens materials and/or improve other physical or optical properties of the materials whilst maintaining an acceptably high refractive index.

Thiourethane-based plastic lenses can be obtained by reacting a polyisocyanate monomer or prepolymer with a polythiol monomer or prepolymer. The prior art discloses a number of lens resin compositions that can be polymerised to form a thiourethane polymer. For example, U.S. Pat. Nos. 4,680,369, 4,689,387, and 4,780,522 disclose lens resin compositions for forming high index ($N_D^{20°\ C.}$ 1.59 or higher) lenses. The compositions contain an aromatic diisocyanate and sulfur containing compounds.

Attempts have also been made to improve other properties of thiourethane lenses. For example, U.S. Pat. No. 4,791,185 discloses lens resin compositions for forming thiourethane lenses having heat resistance to withstand heating conditions in post lens formation processing. The compositions contain a diisocyanate and an isocyanurate-based thiol. Similarly, U.S. Pat. No. 5,059,673 discloses a lens resin composition for forming heat and weather resistant urethane or thiourethane lenses. The lenses are formed by reacting specific polycyclic alkane isocyanates with a polyol compound, a polythiol compound or a thiol compound having a hydroxyl group.

U.S. Pat. No. 5,084,545 discloses a lens resin composition for forming high index urethane or thiourethane lenses. The lens is formed by reacting an isothiocyanate compound with a polyol compound, a polythiol compound or a thiol compound having a hydroxyl group.

There have also been attempts to improve the processing conditions used to form urethane or thiourethane lenses. For example, U.S. Pat. Nos. 5,087,758 and 5,191,055 disclose a mercpato compound having an insensible sulfurous odour and a polythiourethane resin containing the mercapto compound. The mercapto compound is reacted with a polyisocyanate compound, a polyisothiocyanate compound or an isothiocyanate compound having isocyanato groups to form the polythiourethane resin.

U.S. Pat. No. 5,440,358 discloses a high surface hardness lens that is formed by reacting a urethane or thiourethane based monomer having a polymerisable double bond with an acrylate, methacrylate or vinyl monomer.

U.S. Pat. No. 5,310,847 discloses lens resin compositions for forming polyurethane lenses having high refractive index ($N_D^{20°\ C.}$ higher than 1.6) and a glass transition temperature higher than 100° C. The lenses are formed by reacting an at least difunctional polyisocyanate with an acyclic saturated monomer having at least three reactive groups with respect to isocyanates per molecule and having at least 40% thiol groups.

U.S. Pat. No. 5,635,580 discloses a process for the production of a thiourethane lens which serves to decrease the polymerisation time. The process comprises reacting a polyisocyanate compound with two or more polythiol compounds which have different reaction rates with the polyisocyanate compound to form a thiourethane lens.

From the aforementioned description it is clear that by altering the specific monomers used and/or the processing conditions it is possible to form thiourethane lens materials having specific, tailored optical or physical properties. Despite the considerable research that has been carried out to date, there are still drawbacks associated with some of the prior art thiourethane lens materials described above. For instance, technical and economic difficulties may be encountered because the monomers used are not readily available or they are viscous solutions which makes casting more complex. Furthermore, the impact resistance of some of the thiourethanes formed may not be sufficient to allow for the formation of relatively thin lenses. Also, some of the thiourethanes formed have a glass transition temperature that is too low with respect to temperatures necessary for the surface treatment of optical lenses.

Clearly, there is a need for improved and/or alternative materials or processes for forming thiourethane optical lens elements.

Reference to any prior art in this specification is not, and should not be taken as, an acknowledgment or any form of suggestion that this prior art forms part of the common general knowledge in any country.

SUMMARY

The present invention arises from the finding that reaction of a specific diisocyanate monomer with tri- or tetra-thiol monomers leads to the formation of thiourethane lenses having improved impact strength. As a result, it is possible to form thinner lenses having good impact strength.

In a first aspect, the present invention provides an optical lens element resin composition including:
  dicyclohexylmethane diisocyanate;
  a polythiol compound comprising 3 or 4 thiol groups; and
  a thermal catalyst.

The polythiol compound has 3 to 4 thiol groups. Specific examples of such polythiol compounds may be selected from the groups consisting of:

4-mercaptomethyl-3,6-dithia-1,8-octanedithiol [MDO]; Trimethylolpropane Tris(3-mercaptopropionate) [TTMP]; Pentaerythritol Tetrakis(3-mercaptoacetate) [PTMA]; Trimethylolpropane Tris(3-mercaptoacetate) [TTMA]; Pentaerythritol Tetrakis(3-mercapto-propionate) [PTMP]; and mixtures of two or more thereof.

More preferred polythiol compounds having 3 or 4 thiol groups are selected from the group consisting of:

pentaerythritol tetrakis(3-mercaptopropionate), trimethylolpropane tris(3-mercaptopropionate) and mixtures thereof.

In some embodiments, the composition includes dicyclohexylmethane diisocyanate and pentaerythritol-tetrakis-mercaptopropionate, whereas in some other embodiments the composition includes dicyclohexylmethane diisocyanate and trimethylol propane tri-3-mercaptopropionate. In some further embodiments, the composition includes dicyclohexylmethane diisocyanate, pentaerythritol-tetrakis-mercaptopropionate, and trimethylol propane tri-3-mercaptopropionate.

In some embodiments, there thermal catalyst is dibutyltin dichloride. In some embodiments, the composition includes >0.1% dibutyltin dichloride. In some embodiments, the composition includes >0.1% and <0.9% dibutyltin dichloride. In some embodiments, the composition includes 0.3% to 0.7% dibutyltin dichloride. In some embodiments, the composition includes 0.4% to 0.6% dibutyltin dichloride. In some embodiments, the composition includes about 0.5% dibutyltin dichloride.

In a second aspect, the present invention provides an optical lens element formed by curing a lens element resin composition as described herein.

In a third aspect, the present invention provides a process for producing an optical lens element, the process including:
providing a lens element resin composition as described herein;
introducing the lens resin composition into a mould assembly;
heating the mould assembly containing the lens element resin composition under conditions to cure the lens resin composition;
cooling the mould assembly; and
removing the optical lens element from the mould assembly.

General Description

The lens resin compositions described herein can be used to form optical lens elements. The term "lens element" as used herein refers to all forms of individual refractive optical bodies employed in the ophthalmic arts, including, but not limited to finished or unfinished lenses or lens blanks. In some embodiments, the lens element is an ophthalmic lens. Ophthalmic lenses can be used in sunglasses, fashion lenses, non-prescription (piano) lenses, prescription lenses (finished and semi-finished), sport masks, face shields and goggles.

The lens resin composition includes a combination of dicyclohexylmethane diisocyanate and a polythiol compound having 3 or 4 thiol groups. Specific examples of polythiols having 3 to 4 thiol groups include:

4-mercaptomethyl-3,6-dithia-1,8-octanedithiol [MDO]; Trimethylolpropane Tris(3-mercaptopropionate) [TTMP]; Pentaerythritol Tetrakis(3-mercaptoacetate) [PTMA]; Trimethylolpropane Tris(3-mercaptoacetate) [TTMA]; Pentaerythritol Tetrakis(3-mercapto-propionate) [PTMP]; and mixtures of two or more thereof.

Preferred polythiols are pentaerythritol-tetrakis-mercaptopropionate and/or trimethylol propane tri-3-mercaptopropionate. In some embodiments, the lens resin composition includes a combination of dicyclohexylmethane diisocyanate and pentaerythritol-tetrakis-mercaptopropionate. In some embodiments, the lens resin composition includes a combination of dicyclohexylmethane diisocyanate and trimethylol propane tri-3-mercaptopropionate. In some embodiments, the lens resin composition includes a combination of dicyclohexylmethane diisocyanate, pentaerythritol-tetrakis-mercaptopropionate, and trimethylol propane tri-3-mercaptopropionate.

Dicyclohexylmethane diisocyanate has the structural formula:

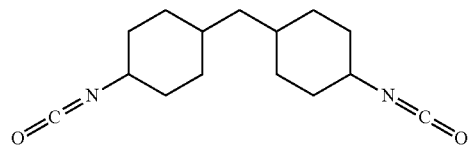 [SMILES: O=C=NC1CCC(CC2CCC(N=C=O)CC2)CC1]

and is available commercially.

Pentaerythritol-tetrakis-mercaptopropionate has the formula $(HSCH_2CH_2COOCH_2)_4C$ and is available commercially.

Trimethylol propane tri-3-mercaptopropionate has the formula $(HSCH_2CH_2COOCH_2)_3CCH_2CH_3$ and is available commercially.

The amount of dicyclohexylmethane diisocyanate in the lens resin composition may be between about 45% and 55% by weight. In some embodiments, the amount is about 49% to about 52% by weight.

The amount of pentaerythritol-tetrakis-mercaptopropionate and/or trimethylol propane tri-3-mercaptopropionate in the lens resin composition may be between about 45% and 55% by weight. In some embodiments, the amount is about 47% to about 51% by weight.

The lens resin composition also includes a thermal catalyst. A number of thermal polymerisation catalysts are known in the art and may be used. In some embodiments, the thermal polymerization catalyst is dibutyltin dichloride. Other polymerisation catalysts that may be used include dibutyltin dilaurate, dimethyltin dichloride, dibutyltin oxide, and dibutyltin diacetate.

In some embodiments, the lens resin composition includes >0.1% dibutyltin dichloride. In some embodiments, the lens resin composition includes >0.1% and <0.9% dibutyltin dichloride. In some embodiments, the composition includes 0.3% to 0.7% dibutyltin dichloride. In some embodiments, the composition includes 0.4% to 0.6% dibutyltin dichloride. In some embodiments, the composition includes about 0.5% dibutyltin dichloride.

The polymerisation catalyst may be used alone or as a mixture of catalysts. The polymerisation catalyst may also include one or more thermal catalysts other than those mentioned above. The one or more other thermal catalysts may, for example, be an amine compound such as a tertiary amine.

We have found that a relatively high concentration of polymerisation catalyst is required for the formation of lenses having a commercially acceptable hardness. If the concentration of the catalyst is too low (i.e. <0.1% by weight in the case of dibutyltin dichloride) the lens that is formed is too soft.

The lens resin composition and/or the optical lens element formed therefrom may contain additional additives, modifiers and/or adjuvants that impart desired properties or characteristics to the optical lens element, or which enhance the performance of the optical lens element. Such additives, modifiers and/or adjuvants include, but are not limited to, mould release agents, UV absorbers, light stabilisers, heat stabilisers, photostabilisers, tints, dyes, free radical scavengers, plasticisers, flow additives, chain extenders, cross-linkers, anti-oxidants, anti-yellowing agents, bluing agents, fillers, resin modifiers, and other processing aids.

The optical lens element is formed by introducing the lens resin composition into a mould assembly. Methods for moulding plastic optical lens elements are known in the art.

Prior to introducing the lens resin composition into the mould it may be degassed.

The lens resin composition may also be filtered prior to introduction into the mould assembly in order to remove any particulate matter that may affect the quality of the cured optical lens element.

After the lens resin composition has been introduced into the mould assembly it is cured to form a solid optical lens element. The curing is carried out under thermal conditions, i.e. by heating the assembled mould containing the lens resin composition.

In some embodiments, the curing may be carried out using a thermal gradient. In some embodiments, the thermal gradient begins with a time period at about 35° C., the temperature is increased incrementally over a period of about 4 hours to a temperature of about 120° C., the temperature is maintained at about 120° C. for a period of about 2 hours and then decreased to about 80° C. over a period of about 1 hour.

After cooling, the cured optical lens element may be removed from the mould and subjected to further processing, if desired. For example, one or more coatings may be coated onto the optical lens element. For example, one or more coatings that provide abrasion resistance and/or anti-reflection properties can be coated onto the optical lens element. Suitable abrasion resistant coating materials are known in the art and include polyfunctional acrylic hard coatings, urethane-based hard coatings, alkyl-based coatings, siloxane based hard coatings or other organic or inorganic/organic hard coatings.

In some embodiments, the refractive index of the optical lens elements formed is 1.540 to 1.560 measured in D line.

In some embodiments, the drop ball impact strength for 2 mm thick 6 based plano lenses without coating is greater than about 1.70 J.

Some advantages of the lens material are:
1) Lenses with a 1.1 mm center thickness can pass the FDA impact dropball test requirement after AR coating;
2) The viscosity of the lens resin composition is low enough that it can be filtered and filled in the moulds at room temperature; and
3) The monomers used are inexpensive

DESCRIPTION OF EMBODIMENTS

Examples of materials and methods for use with the compositions and methods of the present invention will now be provided. In providing these examples, it is to be understood that the specific nature of the following description is not to limit the generality of the above description.

Example 1

244 g of pentaerythritol-tetrakis-mercaptopropionate, 262 g dicyclohexylmethane diisocyanate and 2.53 g dibutyltin dichloride were mixed and degassed for 30 minutes. The composition was then filtered at room temperature through a 4.5 micron polypropylene filter and mould assemblies were filled with the degassed composition at room temperature.

|  |  |  | Molecular weight | Amount (grams) | Weight percentage |
|---|---|---|---|---|---|
| Pentaerythritol-tetrakis-mercapto-propionate | PTMP | Monomer, thiol | Mw = 488 | 244 g | 47.98% |
| Dicyclohexyl-methane diisocyanate | H12-MDI, Desmodur W | Monomer, isocyanate | Mw = 262 | 262 g | 51.52% |
| Dibutyltin dichloride | DBC | Polymerisation catalyst |  | 2.53 g | 0.50% |

The filled mould assemblies were cured in an oven using following curing profile:

| Stage 1 | Hold at 35° C. for 14 hours |
| Stage 2 | Heat up from 35° C. to 120° C. during 4 hours |
| Stage 3 | Hold at 120° C. for 2 hours |
| Stage 4 | Cool down from 120° C. to 80° C. during 1 hour |
| Cure complete | |

The resulting lenses were tested for their properties. The density was 1.24, the refractive index was 1.547 measured in D line, and 1.550 measured in E line. The glass transition temperature of this material (Tg) is 108° C. The Abbe number was 48. The drop ball impact strength was 1.95 J with 2 mm thick 6 based plano lenses without coating. The lenses are more rigid than CR-39 at 100° C.

Twenty semifinished lenses cast with above formulation were surfaced to 1.1 mm −2.00 lenses. The −2.00 lenses were firstly coated with siloxane hardcoating without primer, then coated with anti-reflection coating. All twenty lenses passed the FDA impact drop ball test requirement (0.2 J).

Example 2

244 g of pentaerythritol-tetrakis-mercaptopropionate, 262 g dicyclohexylmethane diisocyanate and 2.53 g dibutyltin dichloride were mixed and degassed for 30 minutes. The composition was then filtered through a 4.5 micron polypropylene filter and mould assemblies were filled with the degassed composition at room temperature.

|  |  |  | Molecular weight | Amount (grams) | Weight percentage |
|---|---|---|---|---|---|
| Pentaerythritol-tetrakis-mercapto-propionate | PTMP | Monomer, thiol | Mw = 488 | 244 g | 47.71% |
| Dicyclohexyl-methane diisocyanate | H12-MDI, Desmodur W | Monomer, isocyanate | Mw = 262 | 262 g | 51.23% |
| Dibutyltin dichloride | DBC | Polymerisation catalyst |  | 2.54 g | 0.50% |
| Tinuvin 329 |  | UV absorber |  | 2.54 g | 0.50% |
| Zelec UN |  | Release agent |  | 0.30 | 0.06% |

The filled mould assemblies were cured in an oven using following curing profile:

| Stage 1 | Hold at 35° C. for 14 hours |
| Stage 2 | Heat up from 35° C. to 120° C. during 4 hours |
| Stage 3 | Hold at 120° C. for 2 hours |
| Stage 4 | Cool down from 120° C. to 80° C. during 1 hour |
| Cure complete | |

The lenses obtained were similar to the lenses from example 1 in impact strength, but with better UV blockage. The mould assemblies were also easier to open because of the presence of the release reagent in the formulation. The glass transition temperature of this material (Tg) is 108° C.

Example 3

265.7 g of trimethylol propane tri-3-mercaptopropionate, 262 g of dicyclohexylmethane diisocyanate and 2.65 g dibutyltin dichloride were mixed and degassed for 30 minutes. The composition was then filtered through a 4.5 micron polypropylene filter at room temperature and mould assemblies were filled with the degassed composition at room temperature.

| | | | Molecular weight | Amount (grams) | Weight percentage |
|---|---|---|---|---|---|
| Trimethylol propane tri-3-mercaptopropionate | TTMP | Monomer, thiol | Mw = 398.55 | 265.7 g | 50.10% |
| Dicyclohexyl-methane diisocyanate | H12-MDI, Desmodur W | Monomer, isocyanate | Mw = 262 | 262 g | 49.40% |
| Dibutyltin dichloride | DBC | Polymerisation catalyst | | 2.65 g | 0.50% |

The filled mould assemblies were cured in an oven using following curing profile:

| Stage 1 | Hold at 35° C. for 14 hours |
| Stage 2 | Heat up from 35° C. to 120° C. during 4 hours |
| Stage 3 | Hold at 120° C. for 2 hours |
| Stage 4 | Cool down from 120° C. to 80° C. during 1 hour |
| Cure complete | |

The drop ball impact strength of the lenses formed was 1.78 J with 2 mm thick 6 based plano lenses without coating. The lenses are softer than CR-39 at 100° C. They are also softer than the lenses from example 1 and example 2, but the material is still suitable for use as a lens material. The glass transition temperature of this material is 95° C.

Twenty semifinished lenses cast with above formulation were surfaced to 1.1 mm −2.00 lenses. The −2.00 lenses were firstly coated with siloxane hardcoating without primer, then coated with anti-reflection coating. All twenty lenses passed the FDA impact drop ball test requirement (0.2 J).

Comparative Example 1

244 g of pentaerythritol-tetrakis-mercaptopropionate, 222 g isophorone diisocyanate (IPDI) and 2.33 g dibutyltin dichloride were mixed and degassed for 30 minutes. The composition was then filtered through a 4.5 micron polypropylene filter and mould assemblies were filled with the degassed composition.

| | | | Molecular weight | Amount (grams) | Weight percentage |
|---|---|---|---|---|---|
| Pentaerythritol-tetrakis-mercaptopropionate | PTMP | Monomer, thiol | Mw = 488 | 244 g | 52.10% |
| Isophorone diisocyanate (IPDI) | IPDI, Desmodur I | Monomer, isocyanate | Mw = 222 | 222 g | 47.40% |
| Dibutyltin dichloride | DBC | Polymerisation catalyst | | 2.33 g | 0.50% |

The filled mould assemblies were cured in an oven using following curing profile:

| Stage 1 | Hold at 35° C. for 14 hours |
| Stage 2 | Heat up from 35° C. to 120° C. during 4 hours |
| Stage 3 | Hold at 120° C. for 2 hours |
| Stage 4 | Cool down from 120° C. to 80° C. during 1 hour |
| Cure complete | |

The lenses are hard lenses. The glass transition temperature is 110° C. The drop ball impact strength was only 0.78 J with 2 mm thick 6 based plano lenses without coating.

Twenty semifinished lenses cast with above formulation were surfaced to 1.1 mm −2.00 lenses. The −2.00 lenses were firstly coated with siloxane hardcoating without primer, then coated with anti-reflection coating. They failed the FDA impact drop ball test requirement (0.2 J).

This comparative example indicates that a combination of the specific monomers recited herein results in the formation of an optical lens element having acceptable impact strength.

Comparative Example 2

244 g of pentaerythritol-tetrakis-mercaptopropionate, 262 g dicyclohexylmethane diisocyanate and 0.506 g dibutyltin dichloride were mixed and degassed for 30 minutes. The composition was then filtered through a 4.5 micron polypropylene filter and mould assemblies were filled with the degassed composition.

| | | | Molecular weight | Amount (grams) | Weight percentage |
|---|---|---|---|---|---|
| Pentaerythritol-tetrakis-mercaptopropionate | PTMP | Monomer, thiol | Mw = 488 | 244 g | 48.17% |
| Dicyclohexyl-methane diisocyanate | H12-MDI, Desmodur W | Monomer, isocyanate | Mw = 262 | 262 g | 51.73% |
| Dibutyltin dichloride | DBC | Polymerisation catalyst | | 0.506 g | 0.10% |

The filled mould assemblies were cured in an oven using following curing profile:

| Stage 1 | Hold at 35° C. for 14 hours |
| Stage 2 | Heat up from 35° C. to 120° C. during 4 hours |
| Stage 3 | Hold at 120° C. for 2 hours |
| Stage 4 | Cool down from 120° C. to 80° C. during 1 hour |
| Cure complete | |

The resulting lens was too soft. The glass transition temperature is 84° C. The impact strength of the 2 mm uncoated lenses was only 0.61 J.

This comparative example suggests that a relatively high concentration of dibutyltin dichloride is required to form a lens having an adequate impact strength (cf Example 1).

Those skilled in the art will appreciate that the invention described herein is susceptible to variations and modifications other than those specifically described. It is to be understood that the invention includes all such variations and modifications. The invention also includes all of the steps, features, compositions and compounds referred to, or indicated in this specification, individually or collectively, and any and all combinations of any two or more of the steps or features.

The invention claimed is:

1. A thiourethane optical lens element resin composition for preparing an optical lens element of high impact strength, the composition including:
    45% to 55% by weight of the composition of dicyclohexylmethane diisocyanate;
    45% to 55% by weight of the composition of polythiol compound selected from the group consisting of pentaerythritol tetrakis-mercaptopropionate, trimethylolpropane tri(3-mercaptopropionate) and mixtures thereof; and
    0.3% to 0.7% by weight of the composition of dibutyltin dichloride thermal catalyst;
wherein when cast as 2 mm thick 6 based plano lenses, the composition provides an impact strength of greater than about 1.70 J without coating.

2. An optical lens element resin composition according to claim 1, wherein the composition includes dicyclohexylmethane diisocyanate and pentaerythritol-tetrakis-mercaptopropionate.

3. An optical lens element resin composition according to claim 1, wherein the composition includes dicyclohexylmethane diisocyanate and trimethylol propane tri-3-mercaptopropionate.

4. An optical lens element resin composition according to claim 1, wherein the composition includes dicyclohexylmethane diisocyanate, pentaerythritol-tetrakis-mercaptopropionate, and trimethylol propane tri-3-mercaptopropionate.

5. An optical lens element resin composition according to claim 1, wherein the composition includes 0.4% to 0.6% by weight of the composition of dibutyltin dichloride.

6. An optical lens element resin composition according to claim 1, wherein the composition includes about 0.5% by weight of the composition of dibutyltin dichloride.

7. An optical lens element resin composition according to claim 1, wherein of dicyclohexylmethane diisocyanate in the lens resin composition is about 49% to about 52% by weight of the composition.

8. An optical lens element resin composition according to claim 1, wherein the total of the amount of pentaerythritol-tetrakis-mercaptopropionate and trimethylol propane tri-3-mercaptopropionate in the lens resin composition is about 47% to about 51% by weight of the composition.

9. An optical lens element formed by curing a lens element resin composition according to claim 1, wherein the refractive index of the lens element is 1.540 to 1.560 measured in D line.

10. A process for producing an optical lens element, the process including:
    providing a lens element resin composition according to claim 1;
    introducing the lens resin composition into a mould assembly;
    heating the mould assembly containing the lens element resin composition under conditions to cure the lens resin composition;
    cooling the mould assembly; and
    removing the optical lens element from the mould assembly.

11. A process according to claim 10, wherein the curing is carried out using a thermal gradient.

12. A process according to claim 11, wherein the thermal gradient comprises increasing the temperature incrementally from about 35° C. over a period of about 4 hours to a temperature of about 120° C., maintaining the temperature of about 120° C. for a period of about 2 hours and then decreasing temperature to about 80° C. over a period of about 1 hour.

* * * * *

UNITED STATES PATENT AND TRADEMARK OFFICE
CERTIFICATE OF CORRECTION

PATENT NO. : 9,057,820 B2  
APPLICATION NO. : 13/378573  
DATED : June 16, 2015  
INVENTOR(S) : Fang Chen Page 1 of 1

It is certified that error appears in the above-identified patent and that said Letters Patent is hereby corrected as shown below:

On the Title Page:

Column 1, Item (73) "Assignee" should read:  
CARL ZEISS VISION AUSTRALIA HOLDINGS LIMITED, Lonsdale (AU)

Signed and Sealed this  
Seventeenth Day of November, 2015

Michelle K. Lee  
*Director of the United States Patent and Trademark Office*